United States Patent
Okubo

(10) Patent No.: US 10,839,497 B2
(45) Date of Patent: Nov. 17, 2020

(54) IMAGE PROCESSING APPARATUS AND METHOD

(71) Applicant: CANON KABUSHIKI KAISHA, Tokyo (JP)

(72) Inventor: Toshiyuki Okubo, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 15/904,990

(22) Filed: Feb. 26, 2018

(65) Prior Publication Data

US 2018/0260944 A1   Sep. 13, 2018

(30) Foreign Application Priority Data

Mar. 9, 2017 (JP) ................................ 2017-045252

(51) Int. Cl.
*G06T 5/00* (2006.01)
*G06T 5/50* (2006.01)

(52) U.S. Cl.
CPC ............... *G06T 5/50* (2013.01); *G06T 5/007* (2013.01); *G06T 2207/20224* (2013.01)

(58) Field of Classification Search
None
See application file for complete search history.

(56) References Cited

U.S. PATENT DOCUMENTS

| 2008/0225333 A1* | 9/2008 | Sato ................... H04N 1/32133 |
| | | 358/1.15 |
| 2013/0093912 A1* | 4/2013 | Uchida ................... H04N 5/365 |
| | | 348/222.1 |
| 2013/0234922 A1* | 9/2013 | Tatsumi ................ G09G 3/3406 |
| | | 345/102 |

FOREIGN PATENT DOCUMENTS

JP    2015-233238 A    12/2015

* cited by examiner

*Primary Examiner* — Vikkram Bali
(74) *Attorney, Agent, or Firm* — Cowan, Liebowitz & Latman, P.C.

(57) ABSTRACT

An image processing apparatus comprises: an acquisition unit that acquires images of a plurality of consecutive frames; a first composite unit that performs lighten composite on the images; a second composite unit that performs darken composite on the images by two consecutive frames, and subtracts an image of a frame before or after the images of the two frames subjected to the darken composite from a result of the darken composite to generate a subtraction image; a third composite unit that performs lighten composite on subtraction images obtained by the second composite unit; and an addition unit that adds a first image obtained by performing the lighten composite on the images by the first composite unit and a second image obtained by performing lighten composite on the subtraction images.

17 Claims, 7 Drawing Sheets

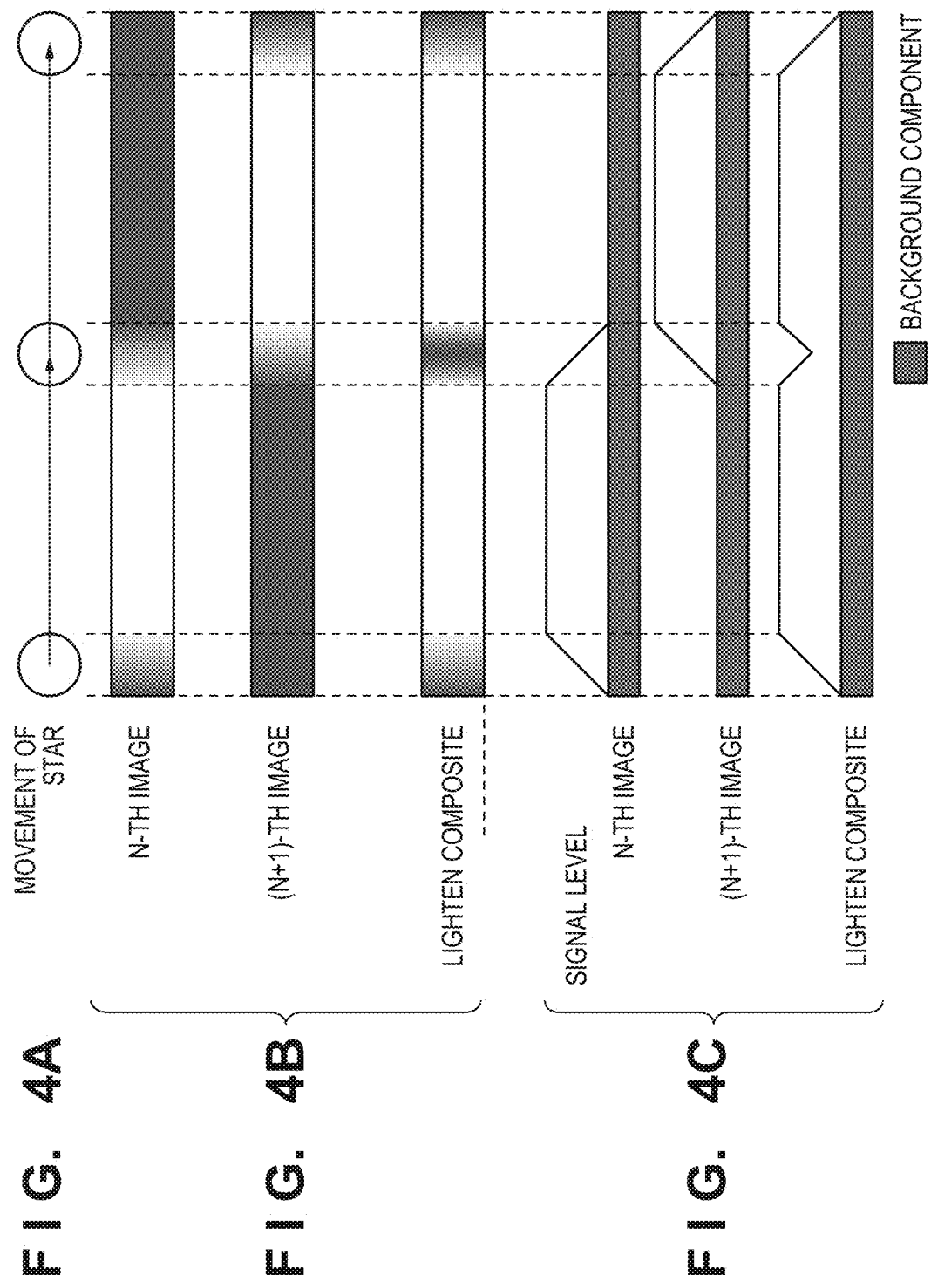

IMAGE PROCESSING APPARATUS AND METHOD

BACKGROUND OF THE INVENTION

Field of the Invention

The present invention relates to an image processing apparatus and method, and more particularly, to an image processing apparatus and method for synthesizing a plurality of images.

Description of the Related Art

In recent years, image capturing devices such as home video cameras and digital still cameras have been widely used. These image capturing devices have a function to confirm photographed images on the spot, which improves the convenience of shooting for users.

In addition, since the sensitivity of image sensors of compact digital cameras has been improved and the S/N ratio has been also improved, there are models equipped with a mode capable of easily shooting the starry sky. Examples of such mode include a mode for shooting the star covered sky, and a mode for taking a picture of the trail of the diurnal motion of stars moving with time.

Japanese Patent Laid-Open No. 2015-233238 proposes, as a mode of taking a star trail picture, a method of performing image shooting a plurality of times, and performing lighten composite on the captured images so that discontinuity of the trails does not occur between the captured images.

However, when taking a picture of star trails using the method described in Japanese Patent Laid-Open No. 2015-233238, since the lighten composite is performed after averaging consecutive images, there is a problem that the brightness of the star trails becomes dark. In addition, when the lighten composite is performed after adding consecutive images by the method of Japanese Patent Laid-Open No. 2015-233238, the brightness of the star trails does not change, but a problem arises in which the background becomes bright.

SUMMARY OF THE INVENTION

The present invention has been made in consideration of the above situation, and, in a mode for photographing a trail of a shiny subject such as a star, for example, obtains a high quality image having no break in the light trail.

According to the present invention, provided is an image processing apparatus comprising: an acquisition unit that acquires images of a plurality of consecutive frames; a first composite unit that performs lighten composite on the images of the plurality of consecutive frames; a second composite unit that performs darken composite on the images of the plurality of consecutive frames by two consecutive frames, and subtracts an image of a frame before or after the images of the two frames subjected to the darken composite from a result of the darken composite to generate a subtraction image; a third composite unit that performs lighten composite on subtraction images obtained by the second composite unit; and an addition unit that adds a first image obtained by performing the lighten composite on the images of the plurality of frames by the first composite unit and a second image obtained by performing lighten composite on the subtraction images of the plurality of frames.

Further, according to the present invention, provided is an image processing apparatus that composites images of a plurality of frames obtained by consecutively capturing images of a moving subject to generate a locus image showing a locus of the subject, the apparatus comprising: a first composite unit that performs lighten composite on the images of the plurality of frames; a second composite unit that performs darken composite on the images of the plurality of frames; and a generation unit that generates the locus image by correcting a first image obtained as a result of the lighten composite by the first composite unit using a second image obtained as a result of the darken composite by the second composite unit.

Furthermore, according to the present invention, provided is an image processing method comprising: acquiring images of a plurality of consecutive frames; performing lighten composite on the images of the plurality of consecutive frames; performing darken composite on the images of the plurality of consecutive frames by two consecutive frames, and subtracting an image of a frame before or after the images of the two frames subjected to the darken composite from a result of the darken composite to generate a subtraction image; performing lighten composite on the subtraction images; and adding a first image obtained by performing the lighten composite on images of the plurality of frames and a second image obtained by performing lighten composite on the subtraction images of the plurality of frames.

Further, according to the present invention, provided is an image processing method for compositing images of a plurality of frames obtained by consecutively capturing images of a moving subject to generate a locus image showing a locus of the subject, the method comprising: performing lighten composite on the images of the plurality of frames; performing darken composite on the images of the plurality of frames; and generating the locus image by correcting a first image obtained as a result of the lighten composite using a second image obtained as a result of the darken composite.

Further, according to the present invention, provided is a non-transitory storage medium readable by a computer, the storage medium storing a program that is executable by the computer, wherein the program includes program code for causing the computer to function as an image processing apparatus comprising: an acquisition unit that acquires images of a plurality of consecutive frames; a first composite unit that performs lighten composite on the images of the plurality of consecutive frames; a second composite unit that performs darken composite on the images of the plurality of consecutive frames by two consecutive frames, and subtracts an image of a frame before or after the images of the two frames subjected to the darken composite from a result of the darken composite to generate a subtraction image; a third composite unit that performs lighten composite on subtraction images obtained by the second composite unit; and an addition unit that adds a first image obtained by performing the lighten composite on the images of the plurality of frames by the first composite unit and a second image obtained by performing lighten composite on the subtraction images of the plurality of frames.

Further, according to the present invention, provided is a non-transitory storage medium readable by a computer, the storage medium storing a program that is executable by the computer, wherein the program includes program code for causing the computer to function as an image processing apparatus that composites images of a plurality of frames obtained by consecutively capturing images of a moving subject to generate a locus image showing a locus of the subject, the apparatus comprising: a first composite unit that performs lighten composite on the images of the plurality of frames; a second composite unit that performs darken composite on the images of the plurality of frames; and a generation unit that generates the locus image by correcting a first image obtained as a result of the lighten composite by the first composite unit using a second image obtained as a result of the darken composite by the second composite unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A to 4C are diagrams showing causes of occurrence of discontinuity when performing lighten composite;

DESCRIPTION OF THE EMBODIMENTS

Exemplary embodiments of the present invention will be described in detail in accordance with the accompanying drawings. In the present embodiment, the present invention will be described using a digital camera as an example.

Figure 1:
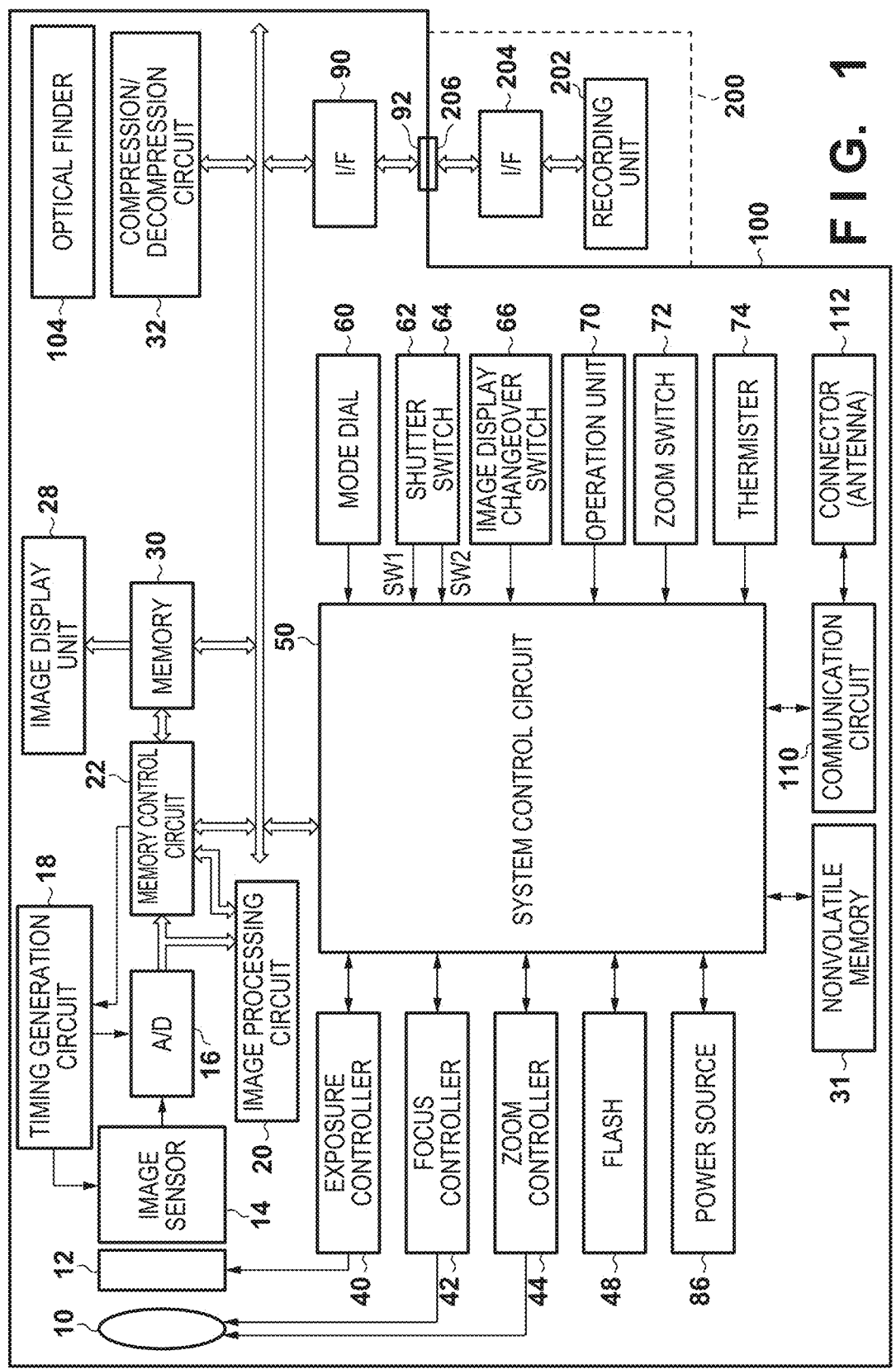
FIG. 1 is a block diagram showing a configuration of an image capturing apparatus according to an embodiment of the present invention.

FIG. 1 is a block diagram showing a configuration of a digital camera as an example of an image capturing apparatus having an image processing function according to an embodiment of the present invention.

In FIG. 1, reference numeral 100 denotes an image capturing apparatus, 10 denotes an imaging lens, 12 denotes a mechanical shutter having an aperture function, 14 denotes an image sensor for converting an optical image into an electric signal, and 16 denotes an A/D converter that converts an analog signal from the image sensor 14 into a digital signal.

A timing generation circuit 18 supplies a clock signal and control signals to the image sensor 14 and the A/D converter 16, and is controlled by a memory control circuit 22 and a system control circuit 50. In addition to the mechanical shutter 12, an electronic shutter, which can be used for moving image shooting and the like, can be realized by controlling the accumulation period of the image sensor 14 by the timing generation circuit 18.

An image processing circuit 20 performs predetermined pixel interpolation processing and color conversion processing on data from the A/D converter 16 or data from the memory control circuit 22. Further, the image processing circuit 20 crops an image and performs scaling processing, thereby realizing an electronic zoom function. Furthermore, the image processing circuit 20 performs predetermined arithmetic processing using the image data output from the A/D converter 16. Then, based on the obtained calculation results, the system control circuit 50 performs through-the-lens (TTL) auto focus (AF) processing, auto exposure (AE) processing, pre-flash (EF) processing with respect to an exposure controller 40 and a focus controller 42. In addition, the image processing circuit 20 performs predetermined arithmetic processing using the image data output from the A/D converter 16 and also performs TTL auto white balance (AWB) processing based on the obtained calculation results.

The memory control circuit 22 controls the A/D converter 16, the timing generation circuit 18, the image processing circuit 20, a memory 30, and a compression/decompression circuit 32. The image data output from the A/D converter 16 is written into the memory 30 via the image processing circuit 20 and the memory control circuit 22, or directly via the memory control circuit. 22.

An image display unit 28 comprises a TFT Liquid Crystal Display (LCD) or the like, and image data for display written in the memory 30 is displayed in the image display unit 28. By sequentially displaying captured image data using the image display unit 28, an electronic finder (EVF) function can be realized. In addition, the image display unit 28 can arbitrarily turn on/off its display according to an instruction from the system control circuit 50, and when the display is turned off, it is possible to greatly reduce the power consumption of the image capturing apparatus 100.

The memory 30 is used for storing captured still images and a moving image, and has a sufficient storage capacity for storing a predetermined number of still images and a moving image for a predetermined period. In sequential image sensing to sequentially capture a plurality of still images or a panoramic image, a large amount of image data can be written into the memory 30 at a high speed. Further, the memory 30 may be used as a work area for the system control circuit 50.

The system control circuit 50 controls the entire image capturing apparatus 100. A nonvolatile memory 31 is constituted by a Flash ROM or the like, and the program code executed by the system control circuit 50 is written in the nonvolatile memory 31, and the system control circuit 50 executes the program code while sequentially reading it out. An area for storing system information and an area for storing user setting information are provided in the nonvolatile memory 31, and various information and settings are read out and restored at the next startup.

The compression/decompression circuit 32 compresses or expands image data using a known compression method such as adaptive discrete cosine transform (ADCT). The compression/decompression circuit 32 reads the image stored is the memory 30, performs compression processing or decompression processing, and writes the processed data in the memory 30.

The exposure controller 40 controls the shutter 12 having the diaphragm function. The exposure controller 40 also has a flash dimming function by interlocking with a flash 48. The focus controller 42 controls the focusing of the imaging lens 10, and a zoom controller 44 controls the zooming of the imaging lens 10.

The flash 48 has an AF auxiliary light projection function and a flash dimming function. The exposure controller 40 and the focus controller 42 are controlled using the TTL method. As described above, the system control circuit 50 controls the exposure controller 40 and the focus controller 42 based on the calculation result obtained by performing arithmetic processing on the image data from the A/D converter 16 by the image processing circuit 20.

Operation means 60, 62, 64, 66, 70 and 72 are used for inputting various operation instructions to the system control circuit 50, and comprise a single or plurality of combinations of switches, dials, touch panels, a device for pointing by line-of-sight detection, a voice recognition device, and the like. Here, the operation means will be described in more detail.

A mode dial switch 60 can turn off the power, and can switch and set various function modes, such as an automatic image capturing mode, an image capturing mode, a panoramic image capturing mode, a moving image recording mode, a playback mode, and a PC connection mode.

A shutter switch SW1 (62) is turned on during operation of a shutter button (not shown), and instructs start of operation such as AF processing, AE processing, AWB processing and the like.

The shutter switch SW2 (64) is turned on when the shutter button (not shown) is completely operated (for example, fully pressed), and instructs start of a series of processes including a readout process, a developing process, and a recording process. In the readout process, in the case of flash photography, after performing the EF process, the image sensor 14 is exposed for an exposure period determined by an AE process, the flash 48 is caused to emit light during the exposure period, and the exposure controller 40 controls to shield the image sensor 14 from light at the same time when the exposure period has elapsed, thereby terminating the exposure of the image sensor 14. Then, a signal read out from the images sensor 14 is written in the memory 30 as image data via the A/D converter 16 and the memory control circuit 22. Then, the developing process is performed by using the arithmetic operation in the image processing circuit 20 and the memory control circuit 22. Furthermore, image data is read out from the memory 30, compression is performed by the compression/decompression circuit 32, and the recording process of writing image data on a recording medium 200 is performed.

An image display changeover switch 66 can set ON/OFF of the image display unit 28. With this function, in image sensing using an optical finder 104, power supply to the image display unit 28 can be cut to save power.

An operation unit 70 comprises various buttons, touch panels, and a rotary dial, and the like, and examples of the operation unit 70 include a menu button, a set button, a macro button, a multi-image playback/repaging button, a flash setting button, a single-shot/sequential/self-timer changeover button, a forward (+) menu item selection button, a backward (−) menu item selection button, a forward (+) playback image search button, a backward (−) playback image search button, an image capturing quality selection button, an exposure correction button, and a date/time set button.

A zoom switch 72 is used by the user to instruct a magnification change for an image to be captured. The zoom switch 72 includes a tele switch for changing an angle of view to the telephoto side and a wide switch for changing the angle of view to the wide angle side. This zoom switch 72 is used to provide a trigger for the zoom controller 44 to change the angle of view of the imaging lens 10 and perform optical zoom operation. It also provides a trigger for electronic zooming that changes the angle of view by performing cropping, pixel interpolation, or the like, on an image by the image processing circuit 20.

A thermistor 74 measures the temperature inside the image capturing apparatus 100. Since defective pixels of the image sensor 14 are affected by temperature, it is necessary to change defect correction processing depending on the temperature at the time of capturing an image. The thermistor 74 is placed near the image sensor 14 in the image capturing apparatus 100 and measures the temperature of the image sensor 14 itself.

A power source 86 comprises a primary battery such as an alkaline battery, a secondary battery such as an NiCd battery, an NiMH battery, or an Li-ion battery, an AC adapter, an external battery, or the like.

An interface 90 connects to a recording medium such as a memory card or a hard disk, and a connector 92 connects to a recording medium such as a memory card or a hard disk.

An optical viewfinder 104 enables performing image capturing using only the optical viewfinder function without using the electronic viewfinder function using the image display unit 28.

A communication circuit 110 has various communication functions such as USB, IEEE 1394, LAN, wireless communication, and the like. Reference numeral 112 denotes a connector or an antenna in the case of wireless communication for connecting the image capturing apparatus 100 to another device by the communication circuit 110.

The recording medium 200 is a recording medium such as a memory card or a hard disk. This recording medium 200 is provided with a recording unit 202 composed of a semiconductor memory, a magnetic disk, etc., an interface 204 with the image capturing apparatus 100, and a connector 206 for connecting with the image capturing apparatus 100.

Figure 2:
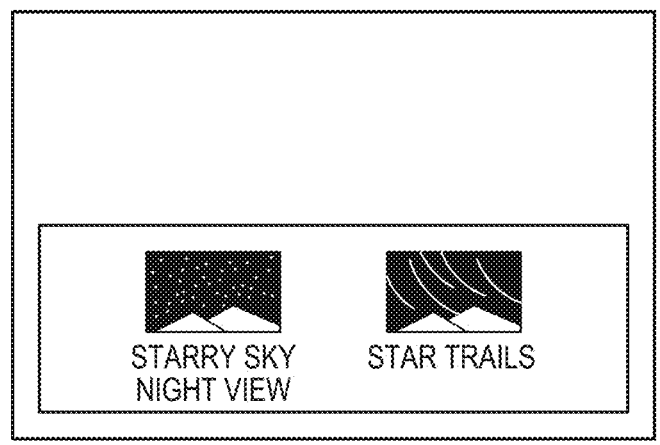
FIG. 2 is a view showing a screen for selecting image capturing modes of a starry sky according to the embodiment.

FIG. 2 shows a screen for selecting image capturing modes of a starry sky. A user can select one of the image capturing modes of the starry sky by operating the operation unit 70. If the user wants to capture the starry sky without star trails in a shot image, a starry sky night view mode is to be selected, and if the user wants to capture the trails of stars, the star trail mode is to be selected, thereby the image capturing apparatus 100 can perform processing suitable for the purpose of a shot image. The system control circuit 50 writes the mode information of the selected mode in the memory 30 to store the mode selected by the user.

When the star trail mode is selected, the user is caused to set an exposure period that is written in the memory 30 in association with the mode information. A long exposure period is set when the user wants to capture long star trails, and a short exposure period is set when the user wants to capture short star trails. Usually, the exposure period of 1 to 2 hours is often set. As the exposure period, a predetermined default exposure period or an exposure period used for image capturing processing in the previous time in the star trail mode may be held so that the user can appropriately change the exposure period.

Figure 3A:
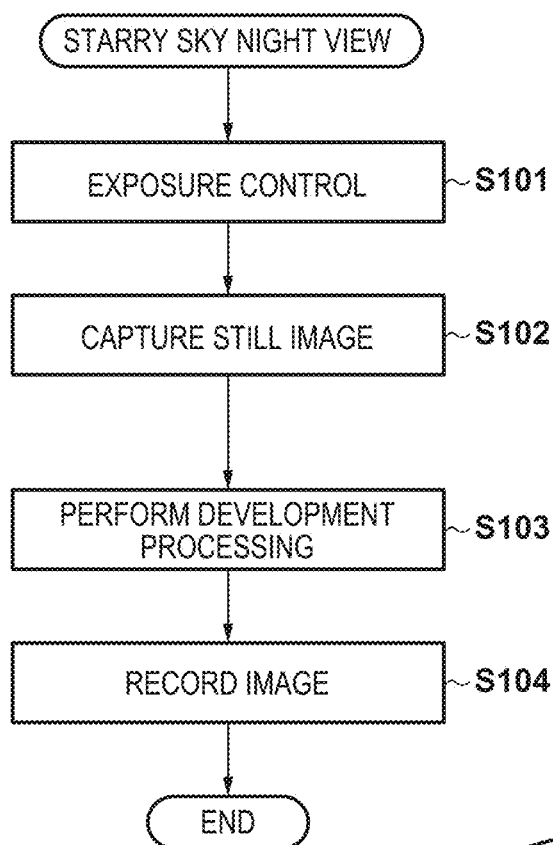
FIGS. 3A and 3B are flowcharts of image capturing processing in a starry sky night view mode and in a star trail mode according to the embodiment.

FIG. 3A is a flowchart of image capturing processing in the starry sky night view mode. When an image capturing instruction is issued in response to the ON operation of the shutter switch SW2 (64) by the user, the system control circuit 50 reads out the mode stored in the memory 30 and performs the image capturing processing of the designated image capturing mode.

If the stored image capturing mode is the starry sky night view mode, in step S101, the diaphragm, shutter speed, and ISO sensitivity are set based on the photometry result. In step S102, a still image is captured based on the exposure control set in step S101. In step S103, the captured image is subjected to development processing using the image processing circuit 20, and in step S104, the image is written in the recording medium 200.

Figure 3B:
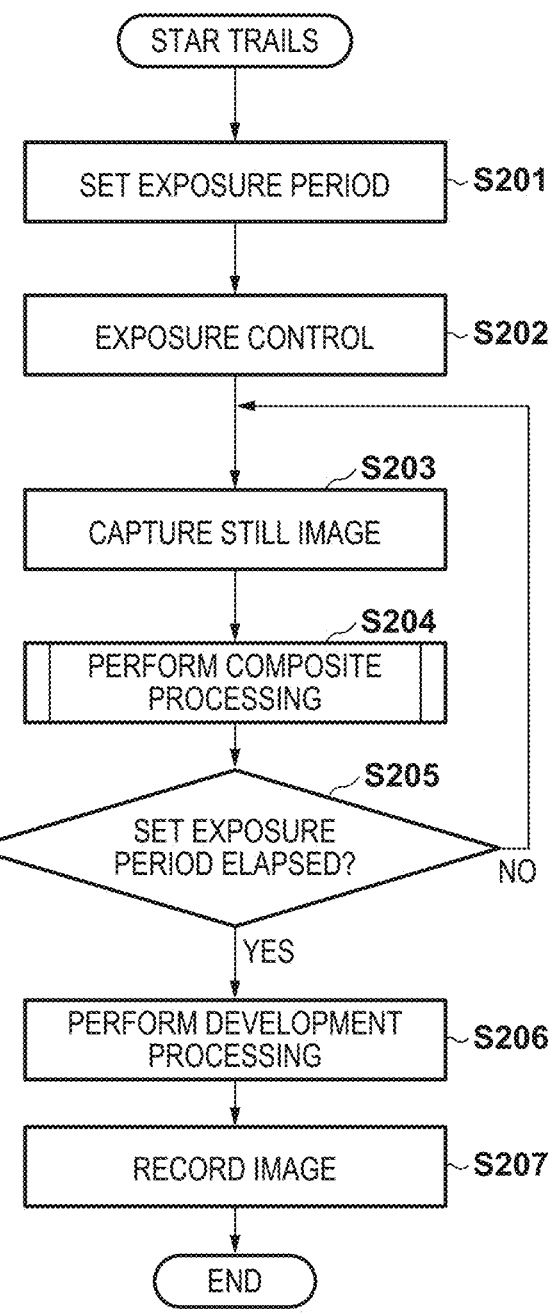

FIG. 3B is a flowchart of image capturing processing in the star trail mode. When an image capturing instruction is issued in response to the ON operation of the shutter switch SW2 (64) by the user, the system control circuit 50 reads out the mode stored in the memory 30 and performs the image capturing processing of the designated image capturing mode.

If the stored shooting mode is the star trail mode, in step S201, the exposure period set in advance by the user is set.

In step S202, the diaphragm, shutter speed, and ISO sensitivity are set based on the photometry result. In step S203, a still image is captured based on the exposure control set in step S202, and in step S204, the captured image is subjected to composite processing. It should be noted that the composite processing performed in step S204 will be described in detail with respect to FIGS. 5 and 6.

In step S205, it is determined whether or not the exposure period set in step S201 has elapsed. If it is determined that the exposure period has not elapsed, the process returns to step S203 to repeat the still image capturing and the composite processing of a captured image. If the set exposure period has elapsed, the process proceeds to step S206.

In step S206, development processing is performed on the captured image using the image processing circuit 20, and in step S207, the developed image is written in the recording medium 200.

Next, the composite processing performed in step S204 will be described. Here, the reason why discontinuities occur when the conventional lighten composite is performed will be described with reference to FIGS. 4A to 4C.

In FIG. 4B, when a star moves at a constant speed as shown in FIG. 4A, the brightness of the star trail in the N-th and (N+1)-th images taken with a long exposure period is shown. When image capturing with a long exposure period is performed, because the star is moving, the end of the trail is dark while the center of the trail is bright as it is completely exposed while the star is moving. When lighten composite is performed on the star trails having such brightness in the N-th and (N+1)-th images, the composite trails are as shown in the third row of FIG. 4B, and the image discontinuity becomes conspicuous.

FIG. 4C shows the brightness of the above-described trail by the signal level of pixels. As shown in FIG. 4C, one trail spans two images, and the signal level per one image is halved. Therefore, when lighten composite is performed, as shown in the third row of FIG. 4B, the signal level becomes lower at the boundary portion than a signal level which should be obtained.

Figure 5:
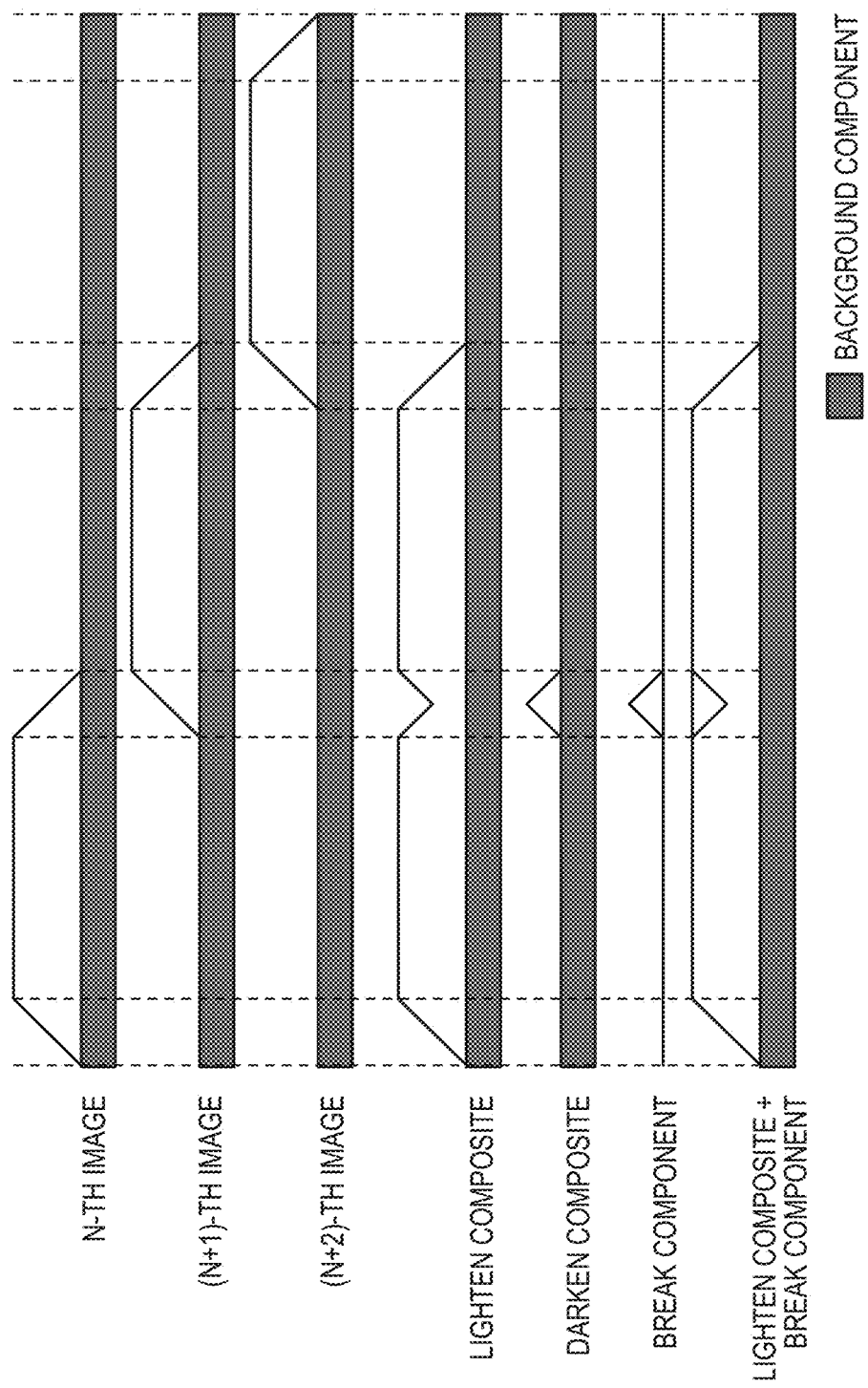
FIG. 5 is a diagram illustrating a composition method using lighten composite and darken composite according to the embodiment.

FIG. 5 is a diagram for explaining a method of composite processing, in which discontinuity of a star trail does not occur, using lighten composite and darken composite according to the present embodiment, which is performed in step S204, and shows a pixel level of pixels corresponding to the star trails of three images.

First, the lighten composite as well as the darken composite are performed on the N-th image and the (N+1)-th image. It is necessary to remove the background portion in order to extract only a discontinuity component of the star trail from the result of the darken composite. In the present embodiment, the (N+2)-th image is subtracted from the result of the darken composite, thereby generating an image of only the discontinuity component of the star trail. At the time of this subtraction, by clapping a level less than 0 to the 0 value, it is possible to extract only the discontinuity component of the star trail. By adding this to the result of the lighten composite, it is possible to generate an image having no discontinuity.

Figure 6:
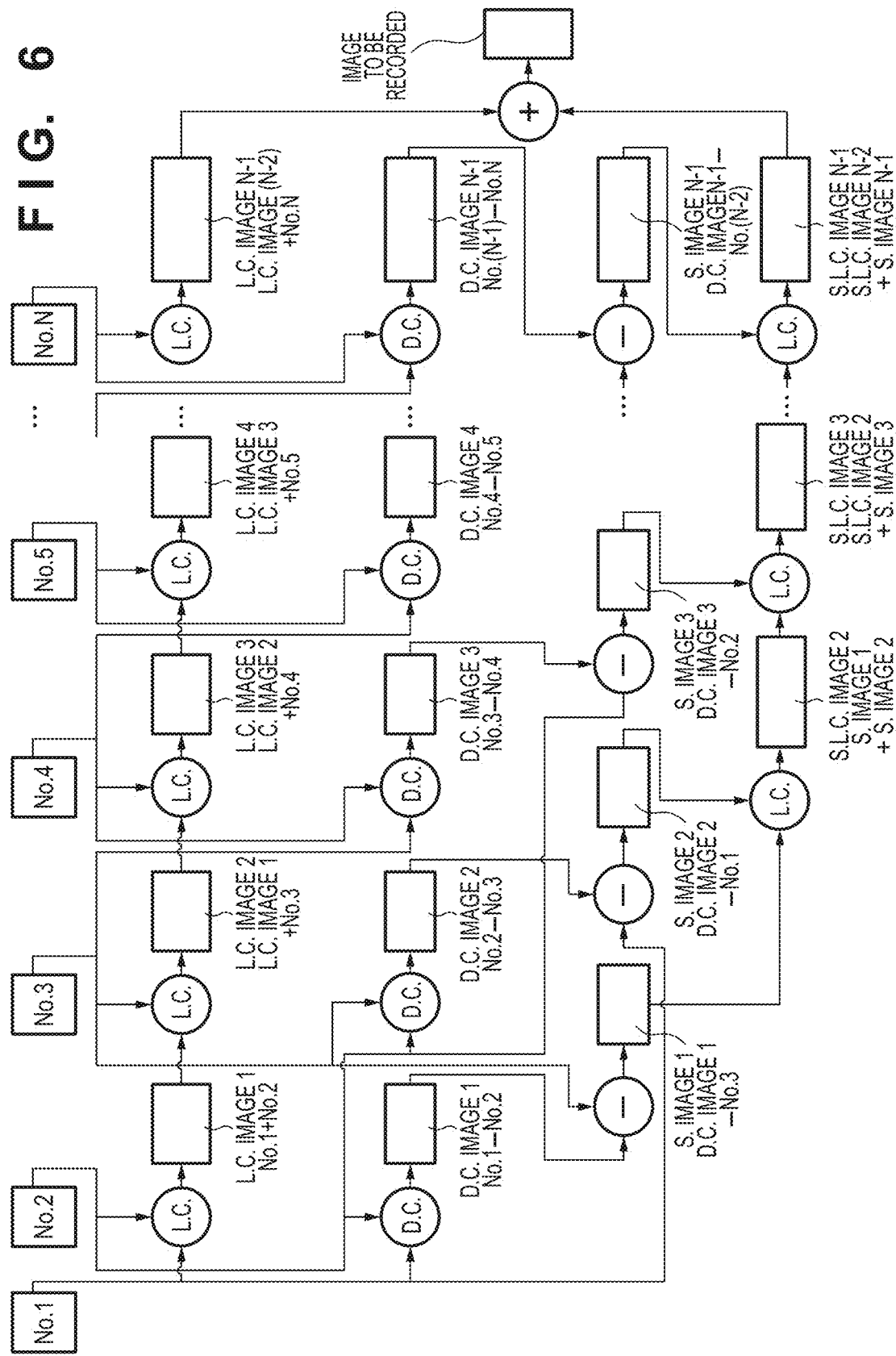
FIG. 6 is a diagram showing a data flow of overall composite processing according to the embodiment.

FIG. 6 is a diagram showing a data flow of the composite processing in step S204. In the following description, an image of the first frame captured after the image capturing instruction is given is referred to as an image No. 1, an image of the second frame as an image No. 2, and in FIG. 6, only the portions No. 1 and No. 2 are shown.

When the image No. 1 and the image No. 2 are captured, lighten composite (L.C.) of the image No. 1 and the image No. 2 is performed to generate a composite image. Hereinafter, an image generated by lighten composite is referred to as a lighten composite image (L.C. image). The range of the frame number of the image used for composition is appended in parentheses. Here, a lighten composite image (1, 2) is generated.

Next, darken composite (D.C.) of the image No. 1 and the image No. 2 is performed to generate a composite image. Hereinafter, an image generated by darken composite is referred to as a darken composite image (D.C. image), and in this case, a darken composite image (1, 2) is generated.

When an image No. 3 is captured, lighten composite of the lighten composite image (1, 2) and the image No. 3 is performed to generate lighten composite image (1-3), and darken composite of the image No. 2 and the image No. 3 is performed to generate a darken composite image (2, 3). Furthermore, the image No. 3 is subtracted from the darken composite image (1, 2). Hereinafter, an image obtained by subtraction is called a subtraction image (S. image), and in this case, a subtraction image (1, 2) is generated. Further, a subtraction image (2, 3) is generated by subtracting the image No. 1 from the darken composite image (2, 3). Then, lighten composite of the subtracted image (1, 2) and the subtracted image (2 to 3) is performed to generate a subtracted lighten composite image (S.L.C. image) (1 to 3).

Here, in order to obtain the subtraction image (1, 2), the image No. 3 is subtracted from the darken composite image (1, 2). That is, the image captured later than the image No. 1 and the image No. 2, which are the originals of the darken composite image (1, 2), is used. On the other hand, in order to obtain the subtraction image (2, 3), the image No. 1 is subtracted from the darken composite image (2, 3). That is, the image captured before the image No. 2 and the image No. 3, which are the originals of the darken composite image (2, 3), is used. The reason for switching subtraction image generation methods in this manner is as follows. First, when subtraction processing is performed to obtain subtraction image (1, 2), since the image No. 1 and the image No. 2 are images of the first two frames, there is no image captured before them, and subtraction cannot be performed without the third image. On the other hand, when performing subtraction processing to obtain the subtraction image (2, 3) and subsequent images, there is an image that was captured earlier, thus the image captured earlier can be used. Further, since no image is captured after an image No. N that is captured at the end, it is necessary to change subtraction processing before the final image is captured so as to subtract an image captured earlier from a darken composite image. In the above example, the switching is performed in the third frame, however, from this point onwards, the switching may be performed in any frame as long as it is before capturing the final image.

When an image No. 4 is taken, lighten composite of lighten composite image (1 to 3) and the image No. 4 is performed to generate a lighten composite image (1 to 4), and darken composite of the image No. 3 and the image No.

4 is performed to generate a darken composite image (3, 4). Then, a subtraction image (3, 4) is generated by subtracting the image No. 2 from the darken composite image (3, 4). Further, by performing lighten composite of the subtracted lighten composite image (1 to 3) and a subtraction image (3, 4), a subtracted lighten composite image (1 to 4) is generated.

Thereafter, the same processing is repeated. When the final image No. N is captured, lighten composite of a lighten composite image (1 to N−1) and the image No. N is performed to generate a lighten composite image (1 to N). Also, darken composite of an image No. N−1 and the image No. N is performed to generate a darken composite image (N−1, N). Then, by subtracting an image No. N−2 from the darken composite image (N−1, N), a subtraction image (N−1, N) is generated. Then, by performing lighten composite of a subtracted lighten composite image (1 to N−1) and the subtraction image (N−1, N), a subtracted lighten composite image (1 to N) is generated.

Finally, by adding the lighten composite image (1 to N) and the subtracted lighten composite image (1 to N), an image to be recorded is obtained. By adding a lighten composite image and a subtracted lighten composite image which is a discontinuity component of a star trail, it is possible to eliminate the discontinuity of the star trail. In other words, by interpolating breaks of the star trails in a composite image obtained by performing only lighten composite of images of the starry sky by adding extracted components corresponding to the breaks, the discontinuity of the star trails is eliminated.

For the image to be recorded obtained in this manner, offset correction is performed before the developing process, and offset misalignment due to addition is corrected. This process will be described with reference to FIG. 7.

Figure 7:
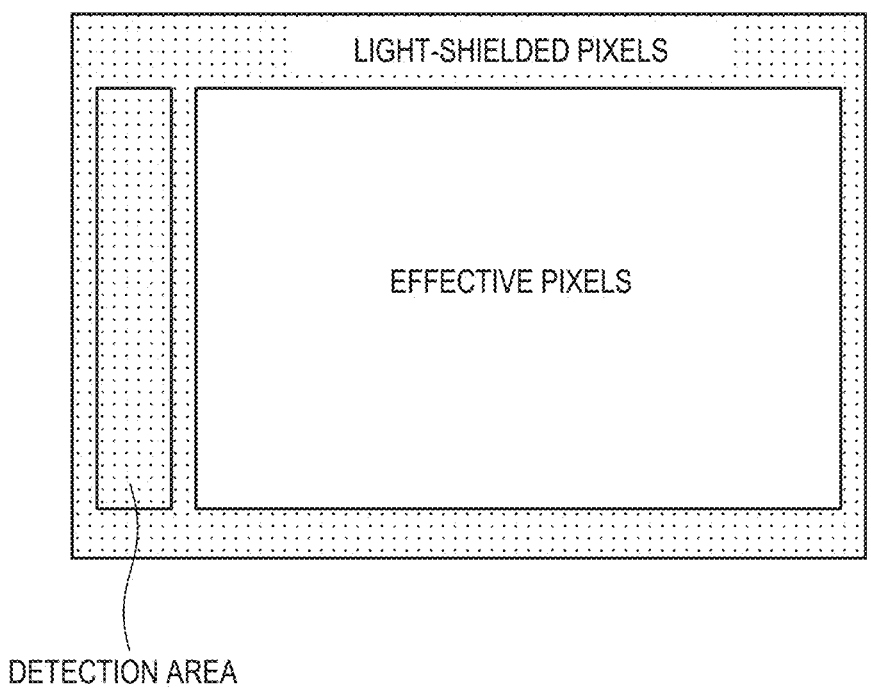
FIG. 7 is a diagram showing an offset correction region according to the embodiment.

FIG. 7 is a diagram showing an offset correction region. As described above, adding the lighten composite image (1 to N) and the subtracted lighten composite image (1 to N) which represents discontinuity components of star trails may cause the offset components of the signals to shift. In order to avoid this, an offset correction process is performed last. Since the above composite processing is also performed on a pixel signal from a light-shielded pixel region, the state of the pixel signal from the light-shielded pixel region of the composite image is detected and offset correction is performed.

The pixel signals in a detection area in FIG. 7 are integrated and normalized to the level per pixel. After performing the normalization, the offset amount detected from the composite image is subtracted from the image to be recorded and a predetermined offset amount is added to the image.

In the present embodiment, the description has been given by taking the starry sky as an example, but it can also be applied to image capturing other than the starry sky. For example, it can be effectively applied to the case of capturing an image of the locus of a car light in night scene photography, the case of capturing an image of a moving subject, and so forth.

The offset correction may be performed irrespective of a color filter, but correction may be performed with respect to each color of a color filter, or after separating pixel signals by color according to the internal structure of the image sensor.

It is to be noted that the still image shooting is explained to use the shutter 12, however, it is possible to perform the still image shooting using only the electronic shutter without using the shutter 12.

In addition, in a case where the number of images captured in the star trail mode is two (images of two frames), it is not possible to subtract the images taken before or after the images, so that the conventional lighten composite shown in FIGS. 4A to 4C is performed.

Further, in the above-described example, description has been made on the case where synthesis of images of a plurality of frames captured in the star trail mode is performed within the image capturing apparatus 100, however, the present invention is not limited thereto. For example, obtained image data of the plurality of frames may be supplied to an external information processing apparatus, and the composite processing described above may be performed in the information processing apparatus that is provided with the image data.

In addition, in the present invention, the lighten composite refers to a composite method of comparing luminance values between a plurality of images to be composited for each pixel, selecting pixels having the largest luminance value and combining them. Similarly, the darken composite refers to a composite method of comparing luminance values between a plurality of images to be composited for each pixel, selecting pixels having the smallest luminance value and combining them. Note that in either of these composite methods, composition may be performed in units of a certain image region composed of a plurality of pixels instead of each pixel.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045252, filed on Mar. 9, 2017 which is hereby incorporated by reference herein in its entirety.

What is claimed is:

1. An image processing apparatus comprising one or more processors and/or circuitry which functions as:
   an acquisition unit that acquires images of a plurality of consecutive frames;
   a first composite unit that performs lighten composite on the images of the plurality of consecutive frames;
   a second composite unit that consecutively performs darken composite on the images of an Nth frame and an N+1th frame, and subtracts an image of an N+2th or N−1th frame from a result of the darken composite, to generate a plurality of subtraction images;
   a third composite unit that performs lighten composite on the plurality of subtraction images obtained by the second composite unit; and
   an addition unit that adds a first image obtained by performing the lighten composite on the images of the plurality of consecutive frames by the first composite unit and a second image obtained by performing lighten composite on the plurality of subtraction images of the plurality of consecutive frames by the third composite unit,
   wherein the lighten composite is a composite method of comparing luminance values between a plurality of images to be composited for each pixel, selecting pixels having the largest luminance value and combining them, and
   wherein the darken composite is a composite method of comparing luminance values between a plurality of images to be composited for each pixel, selecting pixels having the smallest luminance value and combining them.

2. The image processing apparatus according to claim 1, wherein, in a case where the Nth frame is a first frame of the plurality of consecutive frames, the second composite unit subtracts an image of a third frame.

3. The image processing apparatus according to claim 1, wherein, in a case where the N+1th frame is a last frame of the plurality of consecutive frames, the second composite unit subtracts an image of an N−1th frame.

4. The image processing apparatus according to claim 2, wherein, except for a case where the Nth frame is a first frame of the plurality of consecutive frames, the second composite unit subtracts an image of a N−1th frame.

5. The image processing apparatus according to claim 1, wherein, in a case where images acquired by the acquisition unit are of two frames, processes by the second composite unit, the third composite unit, and the addition unit are prohibited.

6. The image processing apparatus according to claim 1 further comprising one or more processors and/or circuitry which functions as a correction unit that performs offset correction on an image obtained as a result of the addition by the addition unit.

7. The image processing apparatus according to claim 1, wherein the second composite unit generates the subtraction image by substituting a signal level of a pixel that is lower than 0 by 0.

8. An image processing apparatus that composites images of a plurality of frames obtained by consecutively capturing images of a moving subject to generate a locus image showing a locus of the subject, the apparatus comprising one or more processors and/or circuitry which functions as:
   a first composite unit that performs lighten composite on the images of the plurality of frames;
   a second composite unit that performs darken composite on the images of the plurality of frames; and
   a generation unit that generates the locus image by correcting a first image obtained as a result of the lighten composite by the first composite unit using a second image obtained as a result of the darken composite by the second composite unit,
   wherein the lighten composite is a composite method of comparing luminance values between a plurality of images to be composited for each pixel, selecting pixels having the largest luminance value and combining them, and
   wherein the darken composite is a composite method of comparing luminance values between a plurality of images to be composited for each pixel, selecting pixels having the smallest luminance value and combining them.

9. The image processing apparatus according to claim 8, wherein the second composite unit consecutively performs the darken composite on the images of an Nth frame and an N+1th frame, subtracts an image of an N+2th or N−1th frame from a result of the darken composite, wherein N is a natural number, and performs the lighten composite sequentially on images obtained by the subtraction to generate the second image.

10. The image processing apparatus according to claim 9, wherein the second composite unit substitutes a signal level of a pixel that is lower than 0 in the image obtained by the subtraction by 0.

11. The image processing apparatus according to claim 8 further comprising one or more processors and/or circuitry which functions as a correction unit that performs offset correction on the locus image obtained by the generation unit.

12. An image processing method comprising:
    acquiring images of a plurality of consecutive frames;
    performing lighten composite on the images of the plurality of consecutive frames;
    consecutively performing darken composite on the images of an Nth frame and an N+1th frame, and subtracting an image of an N+2th or N−1th frame from a result of the darken composite, to generate a plurality of subtraction images, wherein N is a natural number;
    performing lighten composite on the plurality of subtraction images; and
    adding a first image obtained by performing the lighten composite on images of the plurality of consecutive frames and a second image obtained by performing lighten composite on the plurality of subtraction images of the plurality of consecutive frames,
    wherein the lighten composite is a composite method of comparing luminance values between a plurality of images to be composited for each pixel, selecting pixels having the largest luminance value and combining them, and
    wherein the darken composite is a composite method of comparing luminance values between a plurality of images to be composited for each pixel, selecting pixels having the smallest luminance value and combining them.

13. An image processing method for compositing images of a plurality of frames obtained by consecutively capturing images of a moving subject to generate a locus image showing a locus of the subject, the method comprising:

performing lighten composite on the images of the plurality of frames;

performing darken composite on the images of the plurality of frames; and generating the locus image by correcting a first image obtained as a result of the lighten composite using a second image obtained as a result of the darken composite, wherein the lighten composite is a composite method of comparing luminance values between a plurality of images to be composited for each pixel, selecting pixels having the largest luminance value and combining them, and wherein the darken composite is a composite method of comparing luminance values between a plurality of images to be composited for each pixel, selecting pixels having the smallest luminance value and combining them.

14. The image processing method according to claim 13, wherein the darken composite is consecutively performed on the images of an Nth frame and an N+1th frame, and the second image is generated by subtracting an image of an N+2th or N−1th frame from a result of the darken composite wherein N is a natural number, and performing the lighten composite sequentially on images obtained by the subtraction.

15. A non-transitory storage medium readable by a computer, the storage medium storing a program that is executable by the computer, wherein the program includes program code for causing the computer to function as an image processing apparatus comprising:

an acquisition unit that acquires images of a plurality of consecutive frames;

a first composite unit that performs lighten composite on the images of the plurality of consecutive frames;

a second composite unit that consecutively performs darken composite on the images of an Nth frame and an N+1th frame, and subtracts an image of an N+2th or N−1th frame from a result of the darken composite, to generate a plurality of subtraction images, wherein N is a natural number;

a third composite unit that performs lighten composite on the plurality of subtraction images obtained by the second composite unit; and an addition unit that adds a first image obtained by performing the lighten composite on the images of the plurality of consecutive frames by the first composite unit and a second image obtained by performing lighten composite on the plurality of subtraction images of the plurality of consecutive frames by the third composite unit, wherein the lighten composite is a composite method of comparing luminance values between a plurality of images to be composited for each pixel, selecting pixels having the largest luminance value and combining them, and wherein the darken composite is a composite method of comparing luminance values between a plurality of images to be composited for each pixel, selecting pixels having the smallest luminance value and combining them.

16. A non-transitory storage medium readable by a computer, the storage medium storing a program that is executable by the computer, wherein the program includes program code for causing the computer to function as an image processing apparatus that composites images of a plurality of frames obtained by consecutively capturing images of a moving subject to generate a locus image showing a locus of the subject, the apparatus comprising:

a first composite unit that performs lighten composite on the images of the plurality of frames;

a second composite unit that performs darken composite on the images of the plurality of frames; and a generation unit that generates the locus image by correcting a first image obtained as a result of the lighten composite by the first composite unit using a second image obtained as a result of the darken composite by the second composite unit, wherein the lighten composite is a composite method of comparing luminance values between a plurality of images to be composited for each pixel, selecting pixels having the largest luminance value and combining them, and wherein the darken composite is a composite method of comparing luminance values between a plurality of images to be composited for each pixel, selecting pixels having the smallest luminance value and combining them.

17. The image processing apparatus according to claim 16, wherein the second composite unit consecutively performs the darken composite on the images of an Nth frame and an N+1th frame, subtracts an image of an N+2th or N−1th frame from a result of the darken composite wherein N is a natural number, and performs the lighten composite sequentially on images obtained by the subtraction to generate the second image.

* * * * *